United States Patent [19]

Martino

[11] 3,795,931

[45] Mar. 12, 1974

[54] QUICK-CHANGE BRUSH MOUNTING

[75] Inventor: Joseph J. Martino, Cypress, Calif.

[73] Assignee: Chemut Corporation, State College, Pa.

[22] Filed: Feb. 25, 1972

[21] Appl. No.: 229,516

Related U.S. Application Data

[63] Continuation of Ser. No. 58,625, July 27, 1970, abandoned.

[52] U.S. Cl......................... 15/77, 15/21 D, 15/392, 51/168, 308/DIG. 10

[51] Int. Cl............................................. A46b 13/02

[58] Field of Search........... 15/3.17, 21 D, 21 E, 77, 15/88, 392; 308/DIG. 10; 51/168

[56] References Cited

UNITED STATES PATENTS

| | | | |
|---|---|---|---|
| 2,218,913 | 10/1940 | Hughes et al. | 15/77 |
| 2,534,166 | 12/1950 | Gierke et al. | 308/DIG. 10 |
| 3,064,290 | 11/1962 | Bleke | 15/21 D |
| 3,245,102 | 4/1966 | Gallmeyer et al. | 15/77 |
| 3,292,194 | 12/1966 | Randall | 15/77 |

FOREIGN PATENTS OR APPLICATIONS

| | | | |
|---|---|---|---|
| 850,461 | 10/1960 | Great Britain | 15/77 |

*Primary Examiner*—Edward L. Roberts
*Attorney, Agent, or Firm*—Paul & Paul

[57] ABSTRACT

A quick-change brush mounting for use in a printed circuit board scrubber or the like. The shaft of a cylindrical brush is journaled at one end to a bearing cartridge having a flanged, cylindrical end which seats in the circular opening of a plate. A retainer extending over the flanged edge maintains the bearing cartridge attached to the plate. By rotating the cartridge until a notch in the flange is aligned with the retainer, the cartridge may be detached and the brush withdrawn through the opening in the plate. To facilitate vertical adjustment of the brush, the cartridge plates may be slidingly mounted to side panels of the scrubber and provided with micrometer screws for moving the plates and hence for adjusting the spacing between the brush and the circuit board being scrubbed. An ammeter, associated with the brush drive motor, indicates the amount of loading on the brush.

16 Claims, 5 Drawing Figures

INVENTOR.
JOSEPH J. MARTINO
BY
Hinderstein & Silber
ATTORNEYS

INVENTOR.
JOSEPH J. MARTINO
BY
Hinderstein & Silber
ATTORNEYS

QUICK-CHANGE BRUSH MOUNTING

This is a continuation of application Ser. No. 058,625 filed July 27, 1970 now abandoned.

BACKGROUND OF THE INVENTION

1. Field of the Invention

The present invention relates to a quick-change brush mounting for use in a printed circuit scrubber or the like. More particularly, the invention relates to an assembly including a cylindrical brush the shaft of which is journaled to a bearing cartridge detachably mounted in a plate having an opening therethrough, removal of the cartridge permitting withdrawal of the brush through the opening.

2. Description of the Prior Art

In the fabrication of electrical printed circuit boards, often it is necessary to scrape or clean the boards to remove excess or unwanted material therefrom. For example, in printed circuit boards including copper circuitry, undesired copper oxides may develop which must be scrubbed from the board prior to solder plating or attachment thereto of component parts. Similarly, it occasionally is necessary to scrub off excess material such as gold plated on a printed circuit board. Then too, the boards particularly if stored between fabrication steps, may accumulate excess dirt thereon which must be scrubbed off.

For all of these purposes, it is advantageous to use a scrubber of the type in which the printed circuit board is moved tangentially past a rotating, horizontally mounted, generally cylindrical brush. The brush, which may be fabricated of nylon impregnated bristle, "Scotchbrite" (a material produced by the 3M Corporation) or other material, scrubs or abrasively removes the undesired metal, oxide or dirt from the printed circuit board.

In the past, a number of problems have been associated with such printed circuit board scrubber assemblies. For example, it will be appreciated that the material to be scrubbed or removed from the printed circuit board usually is very thin, typically in the order of thousandths of an inch. Thus, it is important that the scrubber brush not bear down too hard against the board, lest excessive amounts of material be removed. On the other hand, if the brush does not sufficiently contact the board, little or no undesired material will be removed. This problem of adjustment of brush pressure against the board is particularly acute when using such a scrubber to remove a controlled amount of material from a board plated with gold or the like.

Yet another problem typically has been encountered in prior art scrubber assemblies. In particular, it is necessary periodically to replace the brush itself, as the bristle material wears down to the point of being ineffectual for cleaning. In prior art printed circuit scrubbers, a complicated disassembly of the brush mounting was necessary to facilitate such brush replacement. Often this replacement operation required several hours of down time as the bearings were carefully removed from the scrubber housing, the brush shaft removed and the brush replaced. This time consuming operation was particularly disruptive because often it required the slowdown of an entire printed circuit facility while the replacement was made.

The present invention overcomes these and other shortcomings of the prior art by providing a quick-change brush mounting for use in a printed circuit scrubber or the like. The mounting permits simple, extremely rapid removal of the brush for replacement thereof, and further includes a novel micrometer-type adjustment facilitating acurate control of the brush spacing with respect to the surface of the boards being scrubbed.

SUMMARY OF THE INVENTION

In accordance with the present invention, there is provided a quick-change brush assembly for use in a printed circuit scrubber or the like. The assembly includes a cylindrical brush mounted on a shaft extending between side panels of the scrubber. The ends of the shaft are connected to bearing cartridges detachably mounted as described below to permit rapid withdrawal of the brush for replacement thereof and to permit vertical adjustment of the brushes with respect to the circuit board surface.

In a preferrred embodiment, each side panel is provided with a plate having a circular opening therethrough, the diameter of the opening being slightly larger than the diameter of the brush. A cylindrical bearing cartridge, having a flange adjacent one end thereof, seats in the circular opening and is maintained attached to the plate by a retainer which extends over an edge of the flange. One end of the brush shaft is journaled to one such bearing cartridge, while the other end of the shaft is detachably connected to a spindle through the other bearing cartridge.

The flange in one bearing cartridge is provided with a notch, so that rotation of the cartridge to align the notch with the retainers permits detachment of the bearing cartridge from the plate. This in turn permits the cylindrical brush to be withdrawn through the circular opening in the plate. Once withdrawn, the brush readily can be replaced. The new brush then is inserted back through the opening in the plate. The bearing cartridge then is seated in the same opening, rotated to move the notch out of alignment with the retainer, and the retainer tightened to complete the assembly.

To facilitate adjustment of the position of the brush relative to the surface to be scrubbed, the bearing cartridge plates may be slidably mounted in retangular openings provided in the side panels. An L-shaped bracket extends from each slidable plate, and an L-shaped support is attached to each side panel in vertically-spaced relationship to the brackets. A micrometer screw threadingly connects each bracket with the associated support to facilitate micrometer adjustment of the plate with respect to the side panel, and hence to permit adjustment of the brush position with respect to the printed circuit board surface.

An ammeter may be operatively connected to the motor used to drive the scrubber brush. As the position of the brush is adjusted with respect to the printed circuit board surface, differences in loading on the brush will be reflected by changes in current to the motor. Thus the ammeter permits accurate, reproducible adjustment of the position of the brush with respect to the printed circuit board surface, this position being reflected by the amount of loading on the brush.

Thus, it is an object of the present invention to provide a quick-change mounting for a cylindrical brush.

Another object of the present invention is to provide a quick-change brush assembly for use in a printed circuit scrubber or the like.

It is another object of the present invention to provide a mounting assembly for a cylindrical brush comprising a plate having a circular opening therethrough and a bearing cartridge detachably mounted to the plate, the brush shaft being journaled to the bearing cartridge, so that detachment of the cartridge from the plate permits withdrawal of the brush through the opening.

Still another object of the present invention is to provide a brush mounting including a cylindrical bearing cartridge detachably, coaxially mountable in a circularly apertured plate.

It is still another object of the present invention to provide a brush assembly including a pair of side panels, a pair of plates slidably mounted in the side panels, and a pair of bearing cartridges detachably mounted to the plates and adapted for journaled support of the brush.

A further object of the present invention is to provide a scrubber brush assembly facilitating both rapid removal of the brush and adjustment of the brush position.

It is a further object of the present invention to provide a printed circuit scrubber assembly including a scrubber brush mounted horizontally between detachable bearing cartridges and adjustable vertically.

Yet a further object of the present invention is to provide a quick-change brush assembly for use in a printed circuit scrubber or the like including a cylindrical brush removable in conjunction with a detachable bearing cartridge, and mounted between end plates incorporating micrometer adjustment means.

BRIEF DESCRIPTION OF THE DRAWINGS

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein.

DESCRIPTION OF THE PREFERRED EMBODIMENTS

Figure 1:
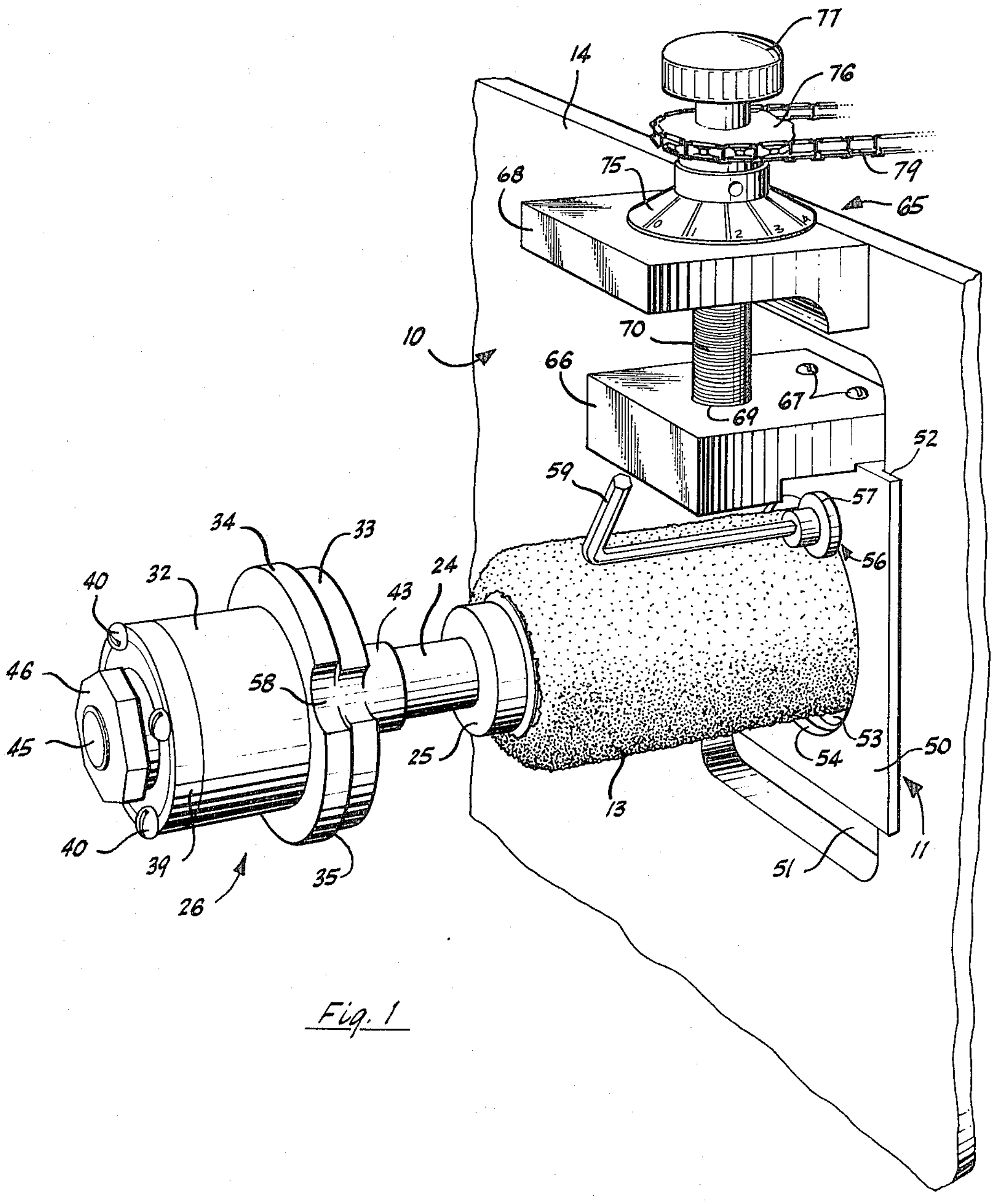
FIG. 1 is a perspective view of a quick-change brush mounting in accordance with the present invention, and including a bearing cartridge shown detached from an associated plate to permit removal of cylindrical scrubber brush.
Figure 2:
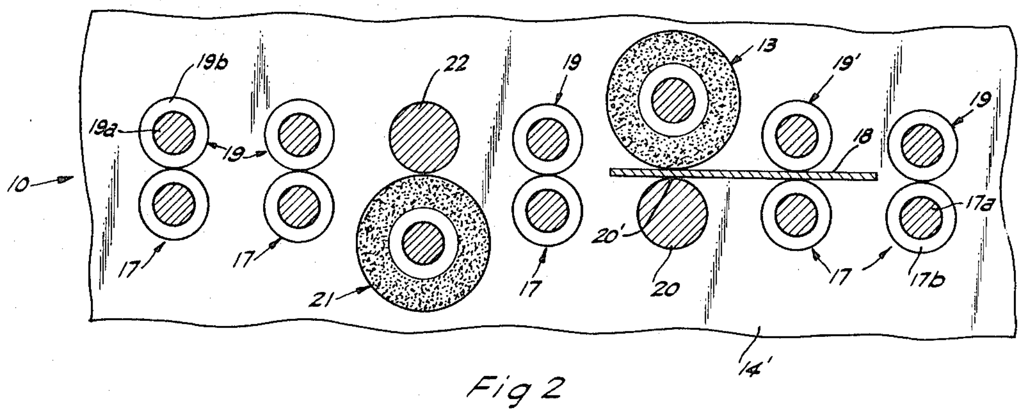
FIG. 2 is a simplified sectional view of a printed circuit board scrubber incorporating rollers for conveying a printed circuit board past one or more brushes mounted in accordance with the present invention.
Figure 3:
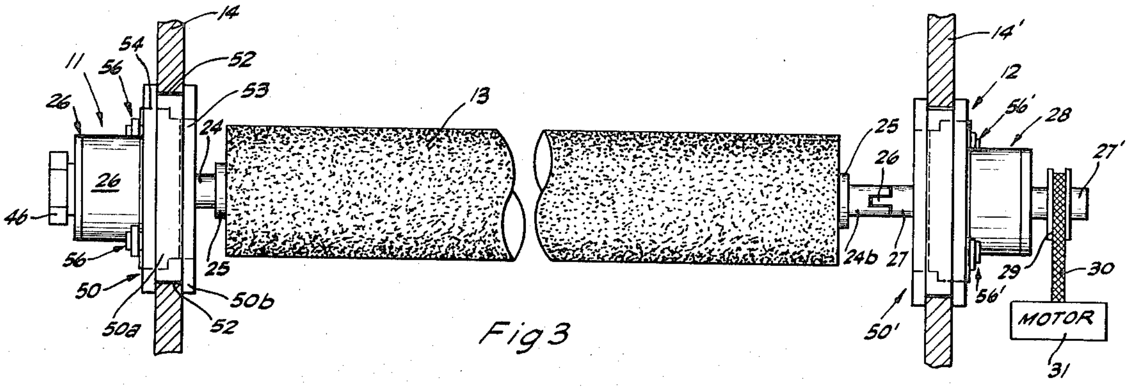
FIG. 3 is a top view, partly in section, showing the manner in which the cylindrical scrubber brush (also seen in FIG. 1) is mounted between a pair of detachable bearing cartridges.

Referring now to the drawings, and particularly to FIGS. 1, 2 and 3 thereof, there is shown a printed circuit board scrubber 10 utilizing a quick-change brush mounting 11 in accordance with the present invention. As described in detail below, quick-change mounting 11 and a similar mounting 12 are used to support a generally cylindrical scrubber brush 13 between a pair of vertical, spaced parallel side panels 14, 14'.

As seen in FIG. 2, printed circuit board scrubber 10 may include a first set of cylindrical rollers 17 extending between side panels 14, 14' and aligned with their axes in a horizontal plane. Typically, each roller 17 may include a shaft **17*a* covered by a rubber or resilient plastic sleeve 17*b*. Although not shown in the drawings, a drive mechanism may be provided to rotate each roller 17 about its respective axis, thereby to convey a printed circuit board 18 placed upon rollers 17 in a horizontal direction past scrubber brush 13**.

A second set of rollers 19 (FIG. 2) may be provided in vertical alignment with rollers 17. Each of rollers 19 also may include a shaft **19*a* surrounded by a rubber or resilient plastic sleeve 19*b*. Rollers 19 need not be driven, but preferably are displaceable vertically to permit passage therebeneath of circuit board 18. In this regard, roller 19' is shown in FIG. 2** as being so vertically displaced.

Still referring to FIG. 2, scrubber assembly 10 may be provided with a solid metal roller 20 extending horizontally between side panels 14 and 14'. The axis of roller 20 is disposed vertically directly beneath the axis of brush 13, and the upper edge 20' of roller 20 is situated in the same horizontal plane as the upper edges of rollers 17. Roller edge 20' thus provides firm support for printed circuit board 18 as the top of that board is scrubbed by brush 13. Similarly, scrubber 10 may be provided with another generally cylindrical scrubber brush 21 extending horizontally between side panels 14 and 14', and disposed beneath the plane of travel of printed circuit board 18 so as to facilitate scrubbing of the underside thereof. A cylindrical metal roller 22 then may be provided above brush 21 to limit upward displacement of printed circuit board 18 as the underside of that board is being scrubbed by brush 21.

As shown in FIGS. 1 and 3, cylindrical brush 13 is fixedly mounted to a shaft 24 by means of a pair of collars 25. One end of shaft 24 is journaled to a bearing cartridge 26 which is a component of a mounting 11. The other end **24*b* of shaft 24 is detachably, coaxially attached by means of a double-U-joint 26 to a spindle 27. Spindle 27 itself is journaled to a bearing cartridge 28 which is a component of mounting 12. Attached to the other end 27' of spindle 27 is a pulley 29. A belt or chain 30 connects pulley 29 to a motor 31 shown schematically in FIG. 3. Shaft 24, spindle 27, pulley 29, belt 30 and drive motor 31 thus cooperate to rotate scrubber brush 13 about an axis through shaft 24 and concentric with bearing cartridges 26 and 28**.

Figure 5:
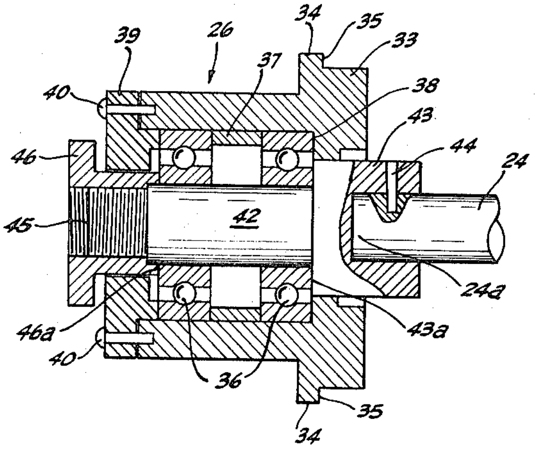
FIG. 5 is a sectional view through a bearing cartridge of the type also shown in FIGS. 1, 3 and 4.

Details of bearing cartridge 26 are shown in FIGS. 1 and 5. Referring thereto, cartridge 26 includes a generally cylindrical housing 32 one end 33 of which is cylindrical and preferably has a diameter slightly larger than the diameter of brush 13. Housing 32 also includes an annular flange 34 spaced away from cylindrical end 33 to form a shoulder 35. Mounted concentrically within housing 32 are one or more bearings 36 which may be separated from each other by a ring spacer 37. Bearings 36 are retained between a shoulder 38 interior of housing 32 and a retaining ring 39 attached by means of screws 40 to the end of housing 32 opposite end 33.

A spindle 42 (see FIGS. 1 and 5) is journaled to bearing 36 and includes a cup-shaped end 43 extending outwardly of cylindrical casing end 33. An end **24*a*** of brush shaft 24 seats within cup 43 and is fixedly attached thereto by means of a pin 44. The other end 45 of spindle 42 is threaded, and receives a bearing retainer nut 46. The interior end 46*a* of nut 46 presses against the race of bearing 36, and thus in conjunction with the shoulder 43*a* of spindle cup end 43 forms a race-to-race lock. Being pinned to shaft 24, spindle 42 effectively forms an extension of that shaft, thus shaft 24 may be described as being journaled to bearing cartridge 26.

Figure 4:
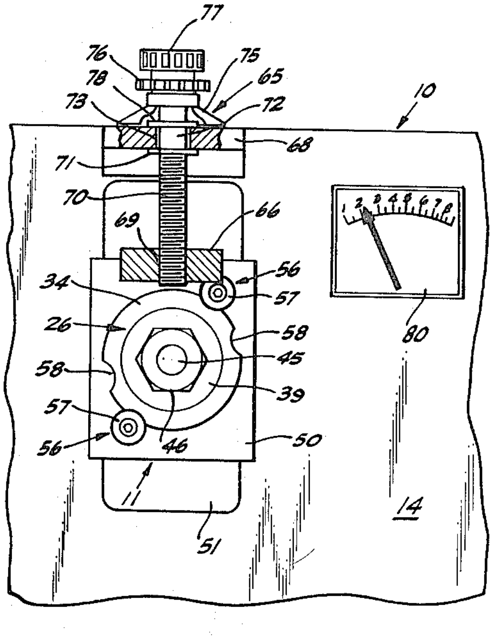
FIG. 4 is a side elevation view, partly in section, of the bearing cartridge assembly also shown in FIG. 1.

Referring now to FIGS. 1, 3 and 4, quick-change mounting 11 also includes a plate 50 adapted to slide vertically in a generally rectangular opening 51 in side panel 14. To facilitate such sliding attachment, plate 50 includes a pair of longitudinal slots 52 along the vertical edges thereof. The width of plate 50 is greater than the width of opening 51, whereas the horizontal spacing between slots 52 is just slightly less than the width of opening 51. Accordingly, the vertical edges of opening 51 seat within slots 52, as best seen in FIG. 3. This arrangement permits plate 50 to slide longitudinally of opening 51, with substantially no motion transverse thereof. For ease of assembly, plate 50 may be fabricated of two pieces, front plate 51*a* having a pair of shoulders corresponding to slots 52, and a back plate 50*b* having a width greater than that of opening 51. With such construction, plate 51*a* first may be inserted within opening 51, followed by attachment of back plate 50*b* thereto to form the slot-edged plate 50 structure shown in the drawings.

Plate 50 also includes a circular opening 53 of diameter just slightly greater than that of cylindrical end 33 of bearing cartridge 26. Thus, the diameter of opening 53 also is larger than the diameter of cylindrical brush 13. Further, opening 53 is provided with a shoulder 54 on the front side of plate 50, which shoulder has diameter just slightly greater than that of annular flange 34 of bearing cartridge 26. With such configuration, bearing cartridge 26 can mount snuggly within plate 50, cylindrical end 33 seating within opening 53 and flange 34 seating within shoulder 54.

Threadingly attached to plate 50 are one or more bolts 56 each having a flange-head 57. Bolts 56 are positioned so that flange-heads 57 project over the edge of opening 53. Further, annular flange 34 (and if necessary cylindrical end 33 of bearing cartridge 26) is provided with one or more notches 58 configured for clearance of bolts 56. Thus in the embodiments shown, each notch 58 is generally circular and has a radius of curvature slightly greater than the radius of flange-head 57. Notches 58 extend radially inwardly from the periphery of flange 34.

By rotating bearing cartridge 26 about an axis concentric with cylindrical end 33 thereof, notches 58 can be aligned with flange-headed bolts 56. With such alignment, cartridge 26 readily can be inserted within plate 50. Subsequent to such insertion, cartridge 26 may be rotated to move notches 58 out of alignment with flange-heads 57, and a wrench 59 or like tool then used to tighten bolt 56. Flange-heads 57 extend over the edge of and will seat against annular flange 34 to retain bearing cartridge 26 firmly attached to plate 50. In this regard, it may be desirable to make the thickness of flange 34 just slightly greater than the depth of shoulder 54. With such configuration, flange 34 will project just slightly forward of plate 50, and permit flange-headed bolt 56 to exert a retaining pressure on bearing cartridge 26.

Bearing cartridge 26 may be detached from plate 50 by reversing the steps described above. Specifically, wrench 59 first is used to loosen retaining bolts 56 and bearing cartridge 26 is rotated to align notches 58 with flange-heads 57. Bearing cartridge 26 then may be withdrawn from plate 50 along an axis generally parallel to shaft 24. Since shaft 24 is journaled to bearing cartridge 26, cylindrical brush 13 will be withdrawn from apparatus 10 through opening 53 as bearing cartridge 26 is moved away from plate 50 (as illustrated in FIG. 1). Note that as brush 13 is withdrawn, brush shaft end 24*b* (FIG. 3) will become detached from spindle 27 at joint 26. Brush 13 may be completely removed from apparatus 10 through hole 53 to permit placement of the brush on shaft 24.

When a new brush 13 has been mounted on shaft 24, the brush may be replaced within apparatus 10 by reinsertion through opening 53. Shaft end 24*b* again is coupled to spindle 27 at joint 26, and bearing cartridge 26 rotated to align notches 58 with flange-headed bolts 56. Cylindrical end 33 and annular flange 34 then are seated respectively within opening 53 and shoulder 54, insuring exact axial realignment of bearing cartridge 26 with respect to plate 50. Cartridge 26 then is rotated until notches 58 are out of alignment with retaining bolts 56, and these bolts tightened to attach cartridge 26 firmly to plate 50.

Mounting 12 (FIG. 3) may be configured similarly to mounting 11. Thus bearing cartridge 28, which may be similar in construction to that shown in FIG. 5, seats within a plate 50′ similar to plate 50. A pair of retainers 56′, which may be identical to flange-headed bolts 56, are used to retain bearing cartridge 28 attached to plate 50′.

To facilitate adjustment of the spacing between cylindrical brush 13 and the surface of the printed circuit board 18 being scrubbed thereby, slidable plates 50, 50′ each may be provided with a micrometer adjustment means such as that shown in FIGS. 1 and 4 and generally designated 65.

Adjustment means 65 includes a bracket 66 projecting forward from plate 50 attached to the top thereof by means of screws 67. A generally L-shaped support 68 is attached to side panel 14 in spaced vertical relationship with respect to bracket 66. Extending through support 68 and engaging a threaded hole 69 in bracket 66 is a threaded micrometer screw shaft 70. An annular collar 71 extends from the periphery of screw shaft 70 near the upper end thereof, and the portion 72 of shaft 70 above collar 71 may be unthreaded. Shaft portion 72 extends through a vertical clearance hole 73 in support 68, and projects upwardly thereof. Attached to this projecting end of screw shaft 70 are a micrometer dial 75, a sprocket wheel 76 and a knob 77.

Operation of micrometer adjustment means 65 now should be apparent. To raise or lower plate 50, knob 77 is turned either clockwise or counter-clockwise. Screw shaft 70 cooperates with threaded hole 69 in bracket 66 to cause corresponding vertical motion of plate 50 longitudinal of opening 51. Upward motion of shaft 70 with respect to support 68 is prevented by annular collar 71, and downward motion of the same shaft is prevented either by micrometer dial 75 or by another annular collar 78 fixed to shaft 70 above support 68 but hidden beneath dial 75. The extent of vertical motion of plate 50 indicated by dial 75.

As plate 50 is moved up or down by micrometer adjustment means 65, the plate carries with it bearing cartridge 26 and hence one end of brush shaft 24. To adjust the vertical position of the other end of brush 13, mounting 12 (FIG. 3) preferably also is provided with a micrometer adjustment means (not shown) similar to that shown in FIG. 4. A chain 79 extends between sprocket wheel 76 and a corresponding sprocket wheel on the micrometer adjustment for mounting 12. Thus, as knob 77 is turned, the micrometer screws associated with plates 50 and 50' are rotated in unison. This results in simultaneous vertical motion of plates 50 and 50', of bearing cartridges 26 and 28, and hence of both ends of brush 13. That is, rotation of knob 77 causes vertical motion of brush 13 while maintaining the axis and shaft 24 thereof horizontal. Accordingly, the above-described micrometer adjustment means readily facilitates adjustment of the spacing between cylindrical brush 13 and the surface of a printed circuit board 18 being scrubbed thereby.

The amount of pressure exerted by scrubber brush 13 against the surface of printed circuit board 18 (FIG. 2) may be indicated by an ammeter 80 (FIG. 4) electrically connected in series with motor 31 (FIG. 3). Should this pressure be increased, as by moving brush 13 downward using micrometer adjustment means 65, the load placed on motor 31 will increase and the concomitant change in current drawn by motor 31 will be indicated by meter 80.

By using meter 80, the amount of pressure applied by brush 13 against printed circuit board 18 may be controlled reproducibly. Thus, if printed circuit boards of different thickness are scrubbed, or if the diameter of brush 13 changes either because of wear or replacement, micrometer adjustment means 65 need only be used to alter the position of brush 13 until meter 80 reads a preselected value. The amount of pressure exerted by brush 13 on printed circuit board 18 then will be the same as before the board size was changed or the brush diameter modified.

Thus there is disclosed a scrubber assembly for printed circuit boards or the like employing a quick-change mounting permitting rapid, easy removal and replacement of a cylindrical brush used by the scrubber. A micrometer adjustment means permits accurate control of the vertical position of the scrubber brush, and in conjunction with an ammeter associated with the brush drive motor, permits reproducible adjustment of the amount of pressure exerted by the brush on a printed circuit board being cleaned.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In an assembly include a generally cylindrical scrubber brush supported on a shaft, a quick-change mounting comprising:

a first plate having an opening therethrough, a bearing cartridge detachably mounted on said plate, one end of said shaft being journaled to said bearing cartridge, detachment of said cartridge from said plate permitting withdrawal of said brush through said opening, first and second spaced parallel panels, said first panel including an elongate opening, said first plate being slidably mounted in said elongate opening, said brush extending between said first and second panels, micrometer adjustment means for controlling the position of said plate in said elongate opening, a second plate slidingly mounted to said second panel, a second bearing cartridge detachably mounted to said second plate, and a spindle journaled to said second bearing cartridge, the other end of said shaft being detachably coaxially connected to said spindle.

2. A mounting as defined in claim 1 wherein said micrometer adjustment means simultaneously controls the positions of both said plates.

3. A mounting as defined in claim 1 further comprising motor means operatively connected to said spindle for rotationally driving said brush.

4. A mounting as defined in claim 1 further comprising an ammeter operatively connected to said motor means to indicate changes in loading thereof.

5. A scrubber assembly comprising:

a housing having first and second spaced parallel side panels, a generally rectangular opening extending through each of said panels, a substantially cylindrical scrubber brush extending on a shaft between said panels, first and second plates each having slotted edges and being disposed respectively within said rectangular openings for longitudinal movement with respect thereto, each plate having a cylindrical opening therethrough, first and second bearing cartridges each having a cylindrical end concentric with the bearings thereof, said ends seating within said circular openings, one end of said shaft being journaled to said first bearing cartridge, the other end of said shaft being detachably connected to a spindle journaled to said second bearing cartridge, and means for selectively retaining or permitting removal of said first bearing cartridge from said first plate, removal of said first cartridge facilitating withdrawal of said brush through said circular opening in said first plate.

6. A scrubber assembly as defined in claim 5 further comprising micrometer adjustment means cooperatively attached to said plates and said side panels for simultaneously moving said cartridges and hence said brush vertically of said side panels.

7. A scrubber assembly as defined in claim 6 wherein said micrometer adjustment means comprises:

first and second brackets attached respectively to said first and second plates, first and second supports attached respectively to said first and second side panels in vertically spaced relationship to said brackets, a first micrometer screw threadingly connected between said first bracket and said first support, and a second micrometer screw threadingly connected between said second bracket and said second support, and chain interconnection means for causing said first and second screws to rotate in unison, rotation of said screws thereby causing simultaneous vertical displacement of said plates.

8. A scrubber assembly as defined in claim 6 further comprising:

a motor and drive means operatively connected between said motor and said spindle to impart rotational motion to said brush, and an ammeter connected to indicate current drawn by said motor, said ammeter thereby indicating changes in loading of said brush resulting from adjustment thereof by said micrometer adjustment means.

9. A scrubber assembly as defined in claim 5 wherein each of said bearing cartridges includes a notched, annular flange spaced from said cylindrical end, said annular flange seating against a portion of said plate when said cylindrical end is seated within said circular opening, and wherein said means for retaining comprises a flanged member threadingly attached to said plate, a portion of said flanged member extending over an edge of said annular flange to retain said bearing cartridge attached to said plate, rotation of said cartridge to align said notch and said flanged member permitting removal of said bearing cartridge from said plate.

10. An apparatus for quick-change mounting of a scrubber brush supported on a shaft, comprising a pair of generally vertically disposed side panels, mounting means for said supporting shaft on each end of said shaft, for rotationally carrying said shaft between said side panels, said mounting means at at least one end of said shaft including:

A first hole in said side panel, a plate mounted in said first hole, said first hole being configured to define a path for movement of said plate therein a second hole in said plate, said second hole being sized to permit the passage of said shaft mounted scrubber brush therethrough, a generally cylindrical bearing cartridge detachably mounted on said plate coaxial with said shaft and said second hole, and adapted to receive said shaft therein.

11. The apparatus of claim 10, wherein said second hole is generally circular, and said cartridge has a cylindrical portion and wherein said cartridge is seated in said second hole with said cylindrical portion in said circular hole.

12. The apparatus of claim 11, wherein said second hole in said plate has two differently sized diametral coaxial bores for two matingly corresponding differently sized diametral coaxial cylindrical portions of said cartridge for endwise seating of said cartridge in said second hole, and means for securing said cartridge to said plate against axial movement therebetween.

13. The apparatus of claim 11, wherein said first hole is a slotted hole, with said plate having selected edge configurations in matingly sliding engagement with adjacent selected edges of said first hole for sliding movement of said plate relative to said hole.

14. The apparatus of claim 13, including adjustment means for adjusting the position of said plate in said hole.

15. The apparatus of claim 13, wherein said slotted edge configuration comprises grooves in receiving engagement with said first hole edges, on opposite sides thereof, and including adjustment means for adjusting the position of said plate in said hole.

16. The apparatus of claim 11, wherein said second hole in said plate has two differently sized diametral coaxial bores for two matingly corresponding differently sized diametral coaxial cylindrical portions of said cartridge for endwise seating of said cartridge in said second hole, and means for securing said cartridge to said plate against axial movement therebetween, wherein said first hole is a slotted hole, with said plate having selected edge configurations in matingly sliding engagement with adjacent selected edges of said first hole for sliding movement of said plate relative to said hole, wherein said slotted edge configuration comprises grooves in receiving engagement with said first hole edges, on opposite sides thereof, and including adjustment means for adjusting the position of said plate in said hole.

* * * * *

UNITED STATES PATENT OFFICE
CERTIFICATE OF CORRECTION

Patent No. 3,795,931 Dated March 12, 1974

Inventor(s) Joseph J. Martino

It is certified that error appears in the above-identified patent and that said Letters Patent are hereby corrected as shown below:

Column 4, line 44, change number "26" to --- 26a ---.

Column 6, line 15, change number "26" to --- 26a ---.

Column 6, line 21, change "joint 26" to --- joint 26a ---.

Signed and sealed this 27th day of August 1974.

(SEAL)
Attest:

McCOY M. GIBSON, JR.
Attesting Officer

C. MARSHALL DANN
Commissioner of Patents